July 10, 1962 F. W. KOSINSKI, JR 3,043,610
TRAILER HITCH
Filed March 17, 1960 2 Sheets-Sheet 2
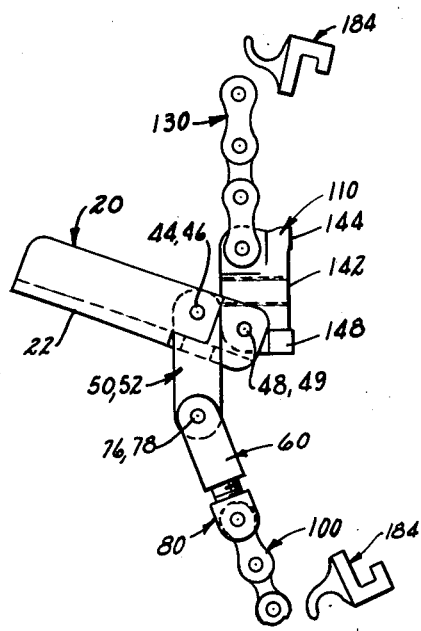
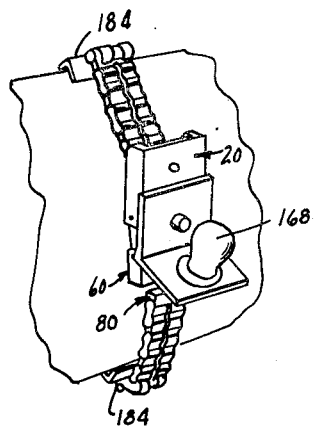
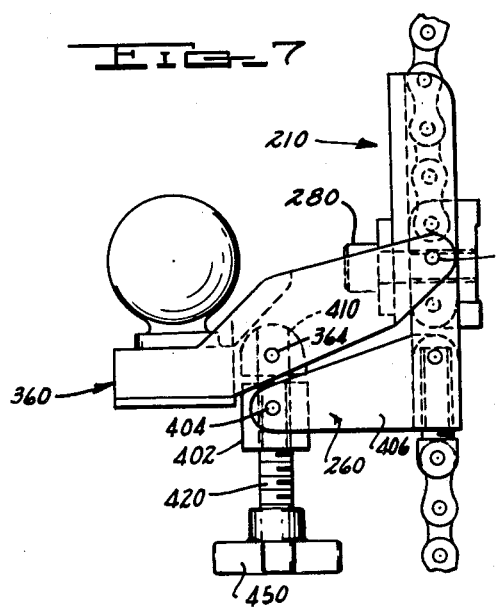
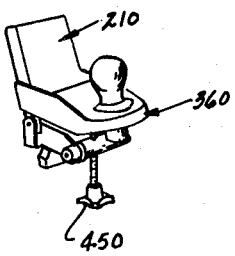
INVENTOR
FELIX W. KOSINSKI JR.
KOTTS & SHERIDAN
ATTORNEYS

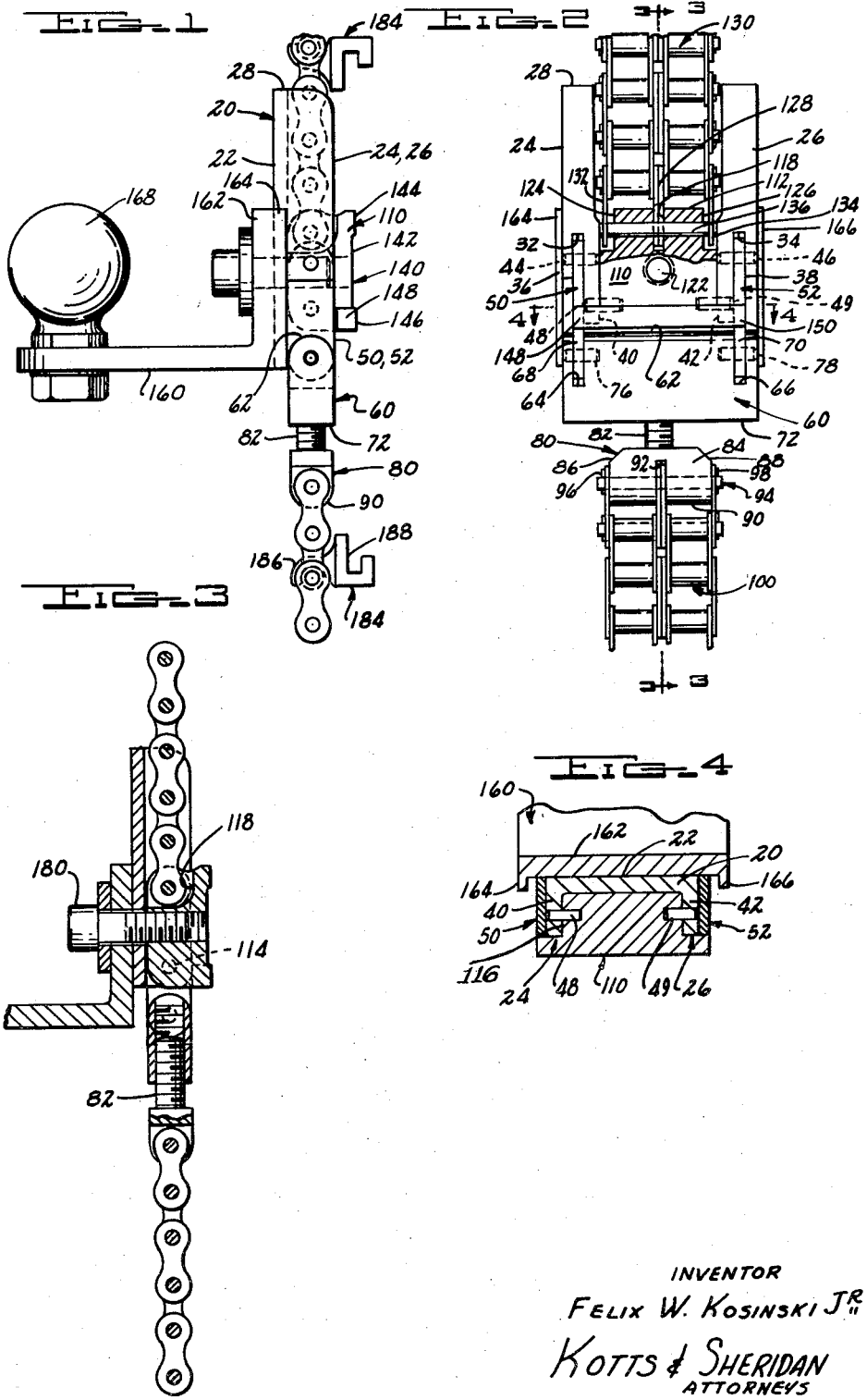

3,043,610
TRAILER HITCH
Felix W. Kosinski, Jr., 705 Sunningdale, Inkster, Mich.
Filed Mar. 17, 1960, Ser. No. 15,695
2 Claims. (Cl. 280—502)

The present invention relates to new and useful improvements in trailer hitches and more particularly to a single universal, toggle type trailer hitch adapted for use on all vehicles, regardless of the bumper width.

For many years, persons engaged in the business of trailer rentals have found it necessary to inventory several thousands dollars worth of trailer hitches to enable them to fit all of the various size and shape bumpers now in existence. In many instances, a customer who is desirous of renting a trailer, finds he must visit several trailer rental lots before he locates one which has a hitch that will fit his particular car. This of course is time consuming and inconvenient.

Therefore it is an object of the present invention to provide a simple, durable and efficient toggle type trailer hitch which is adaptable for use on the bumpers of all motor vehicles.

Another object of the invention is the provision of a toggle type trailer hitch which will permit the operators of trailer rentals to inventory only one hitch per each trailer operated and thereby eliminate the large inventory of hitches now required.

Still another object of the present invention is the provision of a toggle type hitch which is adaptable for use with a fifth wheel device.

These and other objects can be accomplished by the provision of a toggle type hitch having a flanged body member; said flanges in substantially parallel relationship; a first and second anchor block; said first anchor block pivotally affixed to said flanged body about the horizontal axis; said second anchor block secured to said body member with a pair of pivotal links, the upper end of each link pivotally secured to the body with a pin in each, while the lower end of each link is pivotally secured to said second anchor block with a second pin member in each link; a threaded shank having an integral body portion; said threaded shank adjustably secured to said second anchor block; a first section of roller chain secured to the top portion of said first anchor block; a second section of roller chain secured to the lower adjustable portion of said second anchor block; a bumper attaching bracket on each chain adapted for adjustable engagement with one of the roller chain links; coupling means; and means for locking the hitch assembly to a vehicle.

Other objects of this invention will appear in the following description and appended claims, reference being had to the accompanying drawings forming a part of this specification wherein like reference characters designate corresponding parts in the several views.

In the drawings:

FIG. 1 represents a side elevational view of the toggle type trailer hitch embodying the present invention.

FIG. 2 is a rear elevational view of FIG. 1.

FIG. 3 is a cross sectional view taken substantially on lines 3—3 of FIG. 2.

FIG. 4 is a cross sectional view taken on lines 4—4 of FIG. 2.

FIG. 5 is a view of the hitch in the open position.

FIG. 6 is a perspective view of the present invention positioned on a vehicle bumper.

FIG. 7 is a side elevation of a modified form of the present invention.

FIG. 8 is a perspective view of the trailer hitch illustrated in FIG. 7 with the chains and clamp members removed.

Before explaining the present invention in detail, it is to be understood that the invention is not limited in its application to the details of construction and arrangement of parts illustrated in the accompanying drawings, since the invention is capable of other embodiments and of being practiced or carried out in various ways. Also, it is to be understood that the phraseology or terminology employed herein is for the purpose of description and not of limitation.

Referring to the drawings, FIG. 1 illustrates a side elevational view of the preferred embodiment of the present invention. The complete assembly of the toggle type trailer hitch 10 is made up of several parts. A generally rectangular body portion 20 will be described first. The forward face 22 of the generally rectangular body is substantially flat. A pair of flanged ear members 24 and 26 extend rearwardly and at right angles to the flat forward face 22. The top surface of the body 28 is flat and regular, while the corners of the bottom edge 30 are bifurcated at 32 and 34 to receive a pair of pivotal toggle links 50 and 52. The leg portions of the bifurcated sections 32 and 34 are of unequal length. The outside legs 36 and 38 are substantially shorter than the inner legs 40 and 42. A pair of aligned openings in the body 20 locate a first pivot pin 44 to position pivotal link 50, while a second pivot pin 46 positions pivotal link 52. Immediately below the first set of pivot pins 44 and 46 are a second set of pivot pins 48 and 49 which extend through the inside legs 40 and 42 of the body into the pivotal upper chain anchor block 110.

Below the body 20 and pivotally affixed thereto is the lower anchor bracket 60. The lower anchor bracket 60 is generally flat on the front and rear vertical faces and generally rectangular in shape. The top edge 62 is of radial configuration and bifurcated on each end. The bifurcated sections 64 and 66 are adapted to receive the lower ends 68 and 70 of pivotal links 50 and 52. The ends 68 and 70 are pivotal about pivot pins 76 and 78. The bottom edge 72 is square with the front and rear faces. A threaded opening 74 is centrally positioned on the vertical axis of the anchor bracket 60.

Below the lower anchor bracket 60 is the adjustable lower chain anchor bracket 80. A threaded shank 82 is formed integral with the body 84. The body 84 of the lower anchor block 80 is generally rectangular in shape with the upper corners 86 and 88 beveled. The lower edge 90 of anchor block 80 is of radial configuration. A centrally located slot 92 is adapted to cooperate with one end of a flexible, double link roller sprocket chain 100. A horizontally disposed chain anchor pin 94 extends through the block 80 and forms the pivotal means for anchoring the lower flexible roller chain 100. Cotter keys 96 and 98 on each end position anchor pin 94, although snap rings or any other similar means may be used with equal success.

The upper chain anchor block 110 is irregular in shape. The vertical edges 114 and 116 are adapted to pivot about pins 48 and 49 between the legs 40 and 42 of the ear members 24 and 26. It will be noted that the top section 112 of the block 110 seems to be bifurcated when viewed in FIG. 2. However, the true cross sectional configuration of the block is best viewed in FIG. 3 of the drawing. The portion of the anchor block 110 which seems to be bifurcated in FIG. 2 is in effect a pocket member 118 adapted to receive the central portion 128 of a flexible double link roller sprocket chain 130. The sides 114 and 116 of the anchor block 110 are cut away at 124 and 126 to receive the outer links 132 and 134 of the flexible, double sprocket chain 130. A pivot pin 136 extends through the block 110 to anchor the chain 130. The ends of the pin 136 are positioned by riveting or any other suitable means such as cotter keys, snap rings etc.

The rear face 140 of anchor 110 is recessed in the central area 142, while pads 144 and 146 extend transversely across. The lower pad 146 extends completely across the surface of the block and forms a stop 148 and 150 for limiting the movement of the pivotal links 50 and 52 (FIGS. 1 and 3) and the block 110 (FIG. 5).

Secured to the front of the body 20 is an L-shaped ball mounting bracket 160. The embodiment illustrated is disposed at right angles to the body 20. However, it may be disposed at any angle, either up or down. By this means, a level mounting of the ball 168 can be obtained at all times. The vertically disposed part 162 of the bracket 160 has two flanges 164 and 166 which extend around the vertical edges of the body 20 to prevent rotation of the bracket. Bracket 160 is secured to the body by means of a screw 180 which extends through the bracket 160, the flat face 22 of body 20 and into a threaded opening in the upper anchor block 110 (FIG. 3). The screw 180 is positioned after the hitch has been affixed to the bumper.

The hitch assembly 10 is affixed to a bumper by means of a pair of generally S-shaped bracket members 184 (FIG. 1). One side 186 of the bracket 184 is arcuate and adapted to fit between the rollers of the chain. The other side 188 is slotted and adapted to receive the edge flange of a bumper therebetween (not shown).

As viewed in FIG. 5, the hitch 10 of the present invention is shown in the open position. The bracket members 184 are shown out of engagement with a bumper and chains 100 and 130. The chains 100 and 130 are shown short for purposes of illustration. However in actual practice, each of the chains has a number of links and is in the neighborhood of approximately eight inches in length. The reason for the length is adjustment. In some instances, because of the bumper configuration, it is necessary to mount the hitch off center. This is accomplished by raising or lowering the point of engagement of the bracket members 184 with the roller chains. If a suitable position is not obtained the first time the bracket member 184 is raised or lowered as the case may be. Fine adjustment is made by rotation of the lower chain anchor 80 in the bracket 60. Once the proper adjustments in length and position have been made, the body member 20 is pivoted about pins 44 and 46 and the chain anchor block 110 pivoted about pins 48 and 49. This action shortens the chain to lock the hitch into generally three point contact with the bumper. One point of contact at each edge of the bumper and one with the upper chain anchor block. The lock screw 180 is then inserted through the ball mounting bracket 160 to lock the complete assembly.

The complete assembly 10 is shown positioned on a bumper in FIG. 6 of the drawing, while FIG. 7 illustrates a modified form of the present invention. The hitch assembly 210 illustrated in FIG. 7 of the drawings is similar to the preferred embodiment with an addition of parts. The ball mounting bracket member 260 has been modified so as to be pivotal about link pivots 244 and 246. In addition, bracket 260 has been modified to have arms 406 which underlie the ball mounting bracket 360. A pivotal threaded block 402 is interposed between the arms of bracket 260 and pivots about point 404. A second pivotal anchor member 410 is positioned between the arms of the ball mounting bracket 360 and pivotal about a point 364. A threaded shaft member 420 is positioned in the threaded pivotal block 402 and rotatably anchored in the second pivotal block 410 by any suitable means. A handle member 450 is secured to the threaded shaft 420. Therefore, when the hitch assembly 210 is applied to a bumper in the manner previously described and the screw member 280 secured, rotation of the threaded member 420 will cause the ball mounting bracket 360 to move up or down as desired.

From the foregoing description, it is noted that the invention is simple and practical. It provides a trailer hitch which has a minimum number of parts. It can be installed on any bumper with a minimum of time and energy. In addition it can be made adjustable if necessary, and is adaptable for use with a fifth wheel device. The device is durable and can be manufactured by modern mass production methods.

Having thus described my invention, I claim:

1. In a toggle type, universal mounting hitch for use on a vehicle, the combination of, a flanged body member; said flanges in substantially parallel relationship; a first and second anchor block; said first anchor block pivotally affixed to said flanged body about the horizontal axis; said second anchor block secured to said body member with a pair of pivotal links, the upper end of each link pivotally secured to the body with a pin in each, while the lower end of each link is pivotally secured to said second anchor block with a second pin member in each link; a threaded shank having an integral body portion; said threaded shank adjustably secured to said second anchor block; a first section of roller chain secured to the top portion of said first anchor block; a second section of roller chain secured to the lower adjustable portion of said second anchor block; a bumper attaching bracket on each chain adapted for adjustable engagement with one of the roller chain links; coupling means; and all of said members being cooperable to lock the hitch assembly to a vehicle.

2. In a toggle type, universal mounting hitch for use with a vehicle, the combination of, a flanged body member with vertical flanges; said flanges in substantially parallel relationship; a first and second anchor block; the body of said first anchor block vertically disposed between the inside faces of said flanges; the lower portion of said first anchor block pivotally affixed to said flanges; said pivots positioned on a horizontal axis; said second anchor block secured to said body member with a pair of pivotal links; the upper end of said link pivotally secured to the body above the first anchor block pivot, while the lower end of the link is secured to the second anchor block below the pivot; and adjustable means secured to said anchor blocks for securing and locking the hitch to a vehicle.

References Cited in the file of this patent
UNITED STATES PATENTS

| | | |
|---|---|---|
| 2,650,787 | Valentine | Sept. 1, 1953 |
| 2,859,982 | Covi | Nov. 11, 1958 |
| 2,887,325 | Warren | May 19, 1959 |